United States Patent
Schmidt et al.

(10) Patent No.: US 12,508,968 B2
(45) Date of Patent: Dec. 30, 2025

(54) LOWER-LEG SUPPORT FOR A VEHICLE SEAT, VEHICLE SEAT OF A MOTOR VEHICLE, AND MOTOR VEHICLE

(71) Applicant: Mercedes-Benz Group AG, Stuttgart (DE)

(72) Inventors: Bernd Schmidt, Wildberg (DE); Tejas Joshi, Pune (IN)

(73) Assignee: Mercedes-Benz Group AG, Stuttgart (DE)

( * ) Notice: Subject to any disclaimer, the term of this patent is extended or adjusted under 35 U.S.C. 154(b) by 168 days.

(21) Appl. No.: 18/555,127

(22) PCT Filed: Mar. 17, 2022

(86) PCT No.: PCT/EP2022/057000
§ 371 (c)(1),
(2) Date: Oct. 12, 2023

(87) PCT Pub. No.: WO2022/218637
PCT Pub. Date: Oct. 20, 2022

(65) Prior Publication Data
US 2024/0217421 A1 Jul. 4, 2024

(30) Foreign Application Priority Data
Apr. 13, 2021 (DE) ..................... 10 2021 001 908.3

(51) Int. Cl.
*B60N 2/90* (2018.01)
*B60N 3/00* (2006.01)

(52) U.S. Cl.
CPC ............. *B60N 2/995* (2018.02); *B60N 3/002* (2013.01)

(58) Field of Classification Search
CPC .... B60N 2/995; B60N 2205/30; B60N 3/001; B60N 3/002
See application file for complete search history.

(56) References Cited

U.S. PATENT DOCUMENTS

| 2,403,263 A | 7/1946 | Collins |
| 3,794,381 A * | 2/1974 | Caldemeyer ......... A47C 7/5068 |
| | | 297/423.22 |

(Continued)

FOREIGN PATENT DOCUMENTS

| DE | 200 01 130 U1 | 6/2000 |
| DE | 100 56 412 A1 | 5/2002 |

(Continued)

OTHER PUBLICATIONS

International Search Report (PCT/ISA/210) issued in PCT Application No. PCT/EP2022/057000 dated Jun. 20, 2022 (2 pages).

(Continued)

*Primary Examiner* — Milton Nelson, Jr.
(74) *Attorney, Agent, or Firm* — Crowell & Moring LLP (57) ABSTRACT

A lower leg support for a vehicle seat includes first and second securing elements which secure the lower-leg support to the vehicle seat. A first displacement element is rotatably connected to the first securing element and a second displacement element is rigidly connected to the second securing element. A first support element is rotatably held on the first displacement element and faces away from the first securing element in a use position and a second support element is rotatable on the second displacement element and faces away from the second securing element in the use position. The first and second support elements are displaceable from the use position into a non-use position by the first and second displacement elements and, in the use position, the first support element, when unlocked from the second support element, is transferrable into a table position by rotation of the first displacement element.

10 Claims, 7 Drawing Sheets

(56) References Cited

U.S. PATENT DOCUMENTS

| | | | | | |
|---|---|---|---|---|---|
| 5,507,562 | A | * | 4/1996 | Wieland | ............... B60N 3/063 |
| | | | | | 297/423.26 |
| 2019/0322202 | A1 | * | 10/2019 | Hur | ...................... B60N 2/929 |

FOREIGN PATENT DOCUMENTS

| | | |
|---|---|---|
| DE | 10 2010 030 553 A1 | 12/2011 |
| DE | 10 2019 126 180 A1 | 4/2021 |
| DE | 10 2019 133 470 A1 | 6/2021 |
| JP | 9-169233 A | 6/1997 |
| JP | 9-328030 A | 12/1997 |
| JP | 2004-337274 A | 12/2004 |
| JP | 2006-143108 A | 6/2006 |
| JP | 2006-271497 A | 10/2006 |
| JP | 2016-210272 A | 12/2016 |

OTHER PUBLICATIONS

German-languae Office Action issued in German Application No. 10 2021 001 908.3 dated Mar. 10, 2022 (4 pages).

* cited by examiner

LOWER-LEG SUPPORT FOR A VEHICLE SEAT, VEHICLE SEAT OF A MOTOR VEHICLE, AND MOTOR VEHICLE

BACKGROUND AND SUMMARY OF THE INVENTION

The invention relates to a lower-leg support for a vehicle seat. The invention also relates to a vehicle seat having a lower-leg support and to a motor vehicle, with a lower-leg support and/or vehicle seat.

Motor vehicles, such as passenger cars for example, have a vehicle interior. People continue to have greater mobility. Thus, the vehicle interior is increasingly becoming a living space, i.e., a vehicle user is frequently spending more time in the vehicle and thus performs more and more tasks in the vehicle interior. Therefore, the vehicle interior should where possible offer a particularly high degree of comfort and/or flexibility for a wide range of uses. An extendable calf rest or lower-leg rest is very helpful for improving the seat comfort in the motor vehicle.

DE 10 2010 030 553 A1 presents a lower-leg support for a vehicle seat. This lower-leg support has a support part for supporting the lower leg of a vehicle occupant, a carrier element and a first thrust element which is arranged on the carrier element such that it can be moved along a first movement direction and is pivotably coupled to the support part.

A disadvantage of the cited prior art is for example a lack of flexibility of the lower-leg support, or a limited functionality.

It is therefore the object of the present invention to provide a lower-leg support, a vehicle seat and a motor vehicle by means of which a lower-leg support can be used particularly flexibly and/or provides a particularly high level of functionality.

This object is achieved according to the invention by the subject matter of the independent claims. Advantages and advantageous embodiments of the invention are the subject matter of the dependent claims and the description.

A first aspect of the invention relates to a lower-leg support for a vehicle seat. The lower-leg support according to the invention comprises a first securing element and a second securing element which are designed to secure the lower-leg support to opposite-lying side areas of the vehicle seat. The lower-leg support is provided with a first displacement element which is rotatably connected to the first securing element. A second displacement element which is rigidly connected to the second securing element is also provided. A first support element is provided which is rotatably held on an end of the first displacement element facing away from the first securing element in a use position, which first support element can be locked by means of a locking device against a second support element arranged so as to rotate on an end of the second displacement element facing away from the second securing element in the use position. The two support elements can be displaced, in particular together, i.e., in particular if the locking device is closed or locked, from the use position and into a non-use position by means of the two displacement elements. Furthermore, in the use configuration, the first support element, unlocked from the second support element, can be transferred or displaced into a table position by rotation of the first displacement element relative to the first securing element.

The first securing element and the second securing element can each be designed in particular as a support bearing. The respective support bearing or securing element is used to stop or fix/brace and thus hold the lower-leg support on the vehicle seat by securing it to the side areas. The respective displacement element can in particular be extended or displaced in its length or respectively along a direction, in particular a displacement direction. The displacement element preferably has a part secured to the securing element, for example a guide element, and a second part, for example a support arm, which can be moved or transferred relative to this first part.

In this case, the rotatable connection between the first securing element and the first displacement element can be realized, for example, via a swivel joint. The two support elements, in particular when they are locked together or against each other by the locking device, are used together as a support or rest for at least one lower leg or for calves of a vehicle occupant sitting on the vehicle seat. In the non-use position, the support elements are arranged relative to, for example, a seat surface of the vehicle seat in an assembly position—in a state mounted on the vehicle seat—for example directly on or below the seat surface. As a result in particular of extending or moving the displacement elements, the support elements are located in the use position, for example, a short leg length or lower-leg length away from the seat cushion of the vehicle seat, in order to thus advantageously be used as a lower-leg support. If the locking device is open, i.e., the first support element is unlocked from the second support element, the first support element can be pivoted out of the use configuration by a rotation or displacement, for example via the swivel joint, in such a way that it can be used by the vehicle occupant as a table or as a shelf in the table position.

In the use position or use configuration, the first support element is preferably at or below a height level of a seat surface of the vehicle seat and can be moved to a height level above the seat surface by rotating it into the table position. The use position, out of which the support element can be rotated into the table position, is preferably the position in which the displacement elements are extended or moved to an end position with respect to the non-use position. In this case, the use position advantageously describes one of several usage positions which are used to support the lower legs. Thus, when the displacement elements are displaced or, in particular if the locking device is open, when the second displacement element is displaced into the usage position, the lower-leg support can be adapted to a leg length of the vehicle occupant, whereby the use position advantageously predefines the greatest possible adjustment length.

The respective rotatable mounting of the respective support element on the respective end has the effect that the respective support element, which for example has a storage facility on one side, in particular in the form of a cushion, can be oriented towards a lower leg of the vehicle occupant in such a way that the cushion and the lower leg can be comfortably guided towards each other.

In other words, the lower-leg support for a vehicle seat comprises a first support bearing and a second support bearing which are designed for the attachment to the respective side areas of the vehicle seat. A first guide element is rotatably connected to the first support bearing and a second guide element is rigidly connected to the second support bearing. The respective guide element is part of a displacement element and the respective displacement element can be moved between a non-use position and a use position. A respective support element is rotatably arranged on an end of the displacement element facing away from the vehicle seat in the use position. The support elements can hereby be locked to each other via locking and, in an unlocked state, the support element, which is rotatably arranged on the support bearing via the first displacement element, can be transferred by pivoting from the use position into a table position in which the support element can be used as a table by a vehicle occupant.

In summary, a calf support in the form of the lower-leg support for a vehicle seat is shown, wherein the lower-leg support can be arranged or secured in particular on length adjustment rails of a length adjustment device of a vehicle seat, since such a length adjustment rail is formed, for example, on the respective side area of the vehicle seat. The calf support is attached such that it is extendable and pivotable. The support has two support elements that can be locked and unlocked one against the other, whereby the first of the support elements can be folded up and used as a table.

The side areas of the vehicle seat are advantageously located on a left side and a right side of the vehicle seat, based on a vehicle occupant sitting in a correct sitting position on the vehicle seat. The vehicle seat for which the lower-leg support is provided, is advantageously the vehicle seat of a motor vehicle.

In this case, the lower-leg support according to the invention has a plurality of advantages. The lower-leg support according to the invention thus offers a particularly simple solution for designing a lower-leg support that is particularly flexible and furthermore particularly functional, since in addition to the support function for the calves, a table function is also provided for a vehicle occupant. A further advantage results from this dual function, since, for example, a table carried along in addition to the lower-leg support can be dispensed with, whereby the vehicle seat and thus the motor vehicle can be designed, for example, to be particularly lightweight. In addition, further components can be dispensed with, also resulting, for example, in a particularly high level of reliability due to there being fewer component parts and, moreover, a particularly low price for the lower-leg support, the vehicle seat and/or the motor vehicle.

This provides a simple, cost-effective solution with which the dual function—calf support and table—can be provided in one functional unit. Moreover, the securing elements make it possible for force to flow directly into a vehicle carcass, for example by being connected to the, in particular movable, length adjustment rails of the vehicle seat. As a result, a particularly simple adaptation and moreover a particularly low installation space requirement can be realized.

In one advantageous embodiment of the invention, the first support element has a, in particular foldable, table surface extension element. In other words, a table extension element is provided for extending or enlarging a surface of the first support element rotatably mounted on the first end that can be used as a table surface. This can, for example, be extended from a part of the support element to enlarge the table surface. Advantageously, however, the table extension element can be folded, in particular by means of a folding mechanism, for example a hinge. Via the folding mechanism, the table surface extension element can be arranged on a part of the support element, in particular on the part that is used as a rest for the lower leg. In the table position, the first support element can be pivoted or rotated by the rotatable bearing on the end in such a way that one side of the support element used as a table surface points upwards in order to be used as a tabletop. The table surface extension element can be arranged on this by the folding mechanism. By folding, in particular by 180 degrees, the table surface extension element can be moved in order to extend the table surface.

This affords the advantage for the lower-leg support that the latter can be used particularly advantageously in its dual function as a table, since a table surface that is provided is particularly large. In addition, the table surface extension element or the part used as a table surface of the remaining support element can, for example, have depressions for holding beverage cups and/or cutlery and/or crockery and/or electronic devices and/or anything else. In this way, additional functions can be provided in the table position.

In another advantageous embodiment of the invention, the respective displacement element is formed from a guide element connected to the respective securing element and a support arm which is movable relative to the guide element and which has the respective end on which the respective support element is arranged. The first guide element is thus rotatably connected to the first securing element and the second guide element is rigidly connected to the second securing element. In this case, the respective guide element is used to guide, in particular when displacing the respective support arms, to move between the non-use position and the use position or between the non-use configuration and the use configuration. Thus, the respective guide element is fixed in position relative to the vehicle seat, or at least one component of the vehicle seat, such as a seat element. The respective support arm is thus moved on the guide element with respect to the vehicle seat. This embodiment of the respective displacement element results in the advantage that a displacement of the support elements between the non-use position and the use position can be carried out particularly advantageously and, for example, particularly few components need to be used for this.

In another advantageous embodiment of the invention, a first drive is provided by means of which the first support element can be displaced from the use position into the table position. Additionally or alternatively, a second drive is provided by means of which the two support elements that are locked to one another can be displaced between the use position and the non-use position. In this case, the respective drive can, for example, have an electric motor, which is supplied with power, in particular via an onboard electrical system. By designing the second drive in such a way, for example by arranging it on the second displacement element, that both support elements can be moved in the state locked by the locking device, a third drive can be dispensed with, for example. Furthermore, the second drive is used in particular to move or displace the two support elements—or in the unlocked state, the second support element—into one of the usage positions. Using at least one of the drives results in the advantage that the lower-leg support can be operated particularly advantageously, since the movement from the use position into the non-use position or from the use position into the table position is carried out more or less independently for a vehicle occupant, since they do not have to use their own force or movement to move the support to the respective position. In this way, the vehicle occupant benefits from a particular level of comfort.

In another advantageous embodiment of the invention, the second support arm has a toothing and/or a toothed rack and/or a spindle, via which the displacement between the use position and the non-use position can be carried out by means of the second drive. In other words, the support elements are moved because the toothing and/or the toothed rack and/or the spindle are driven or moved by the second drive. This results in the advantage that a movement of the lower-leg support is made possible in a mechanically particularly reliable manner.

In another advantageous embodiment of the invention, the first support element has a first connecting surface which is oriented so as to be congruent with a second connecting surface of the second support element while the two support elements are locked to each other. This means that the first connecting surface is covered by the second connecting surface. Furthermore, in the locked state, the connecting surfaces advantageously lie directly against or on top of each other. Additionally or alternatively, the two connecting surfaces have a region of overlap by means of which the connecting surfaces touch each other when the first support element is displaced from the table position into the use position, whereby the support elements can be moved towards each other to be locked or for locking by means of the locking device. In other words, the first and the second connecting surfaces are positioned in relation to each other or overlap in such a way that when the first support element is displaced or transferred from the table position into the use position by touching the connecting surfaces, the two support elements can be moved towards each other for locking.

The two connecting surfaces can be at an angle, for example. In this context, at an angle means: neither vertical nor horizontal, to a direction that is predefined by the rotation or a rotational movement of the first support element between the table position and use position. Thus, when they are moved, the two support elements come together in a conveniently motion-controlled manner from a certain pivot angle setting, which is a state between the table position and the use position (and/or between the use position and the non-use position), whereupon the locking mechanism or the locking device can be closed particularly simply. The connecting surfaces result in the advantage that particularly little effort is needed for locking, since the two support elements move towards each other into a locked position by touching each other and the connecting surfaces then nestling against each other more or less independently in the rotational movement. As a result of the connecting surfaces covering each other in the closed state of the locking device, the lower-leg support can moreover be made particularly compact.

In another advantageous embodiment of the invention, the second support element is wider than the first support element. In particular, the second support element can have twice the width, so that for the entire width of the support elements, the first support element is one third and the second support element is two thirds of the width of the part (the two support elements) used for supporting the lower leg. This division or different widths of the support elements results in the advantage that the second support element, which is also used as a support for the lower legs while the first support element is in the table position, still has a width that can be used to comfortably support not just one lower leg of the vehicle occupant, but both lower legs of the vehicle occupant. Moreover, no such width is required for the first support element, for example because of the table extension element, since the table surface can be enlarged by the table extension element. This results in the advantage that the lower-leg support can be used particularly comfortably.

A second aspect of the invention relates to a vehicle seat which has the lower-leg support according to the invention or one of the described embodiments of the lower-leg support. In this case, the vehicle seat can be designed as a permanently fixed vehicle seat, so that the two securing elements are secured, in particular directly, to a floor connection of the vehicle seat. Alternatively, the vehicle seat can be adjustable in length or along the vehicle longitudinal direction and have a corresponding length adjustment device. In this case, the first securing element is secured to a first length adjustment rail of the length adjustment device and the second securing element is secured to a second length adjustment rail of the length adjustment device.

The vehicle seat according to the invention results in the advantage that a particularly comfortable lower-leg support of the vehicle seat can be realized both on permanently fixed vehicle seats and on length-adjustable vehicle seats.

A third aspect of the invention relates to a motor vehicle, in particular a motor car in the form of a passenger car, which has a lower-leg support according to the invention and/or an advantageous embodiment thereof and additionally or alternatively a vehicle seat according to the invention.

In an advantageous embodiment of the third aspect of the invention, the first securing element and thus the components arranged on the first securing element, such as the first displacement element and the first support element, are arranged on a side of the vehicle seat or on the side of a vehicle seat facing away from a vehicle door. In other words, the first support element, which can form the table function or the table position, is arranged on the tunnel side of the motor vehicle. The arrangement on the side of the vehicle seat facing away from the vehicle door results in the advantage that it is easy to get in and out of the vehicle seat even if the first support element is in the table position.

Advantages and advantageous embodiments of the first aspect of the invention are to be regarded as advantages and advantageous embodiments of the second and/or third aspect of the invention and vice versa in each case. Thus, advantages and advantageous embodiments of the third aspect of the invention are to be regarded as advantages and advantageous embodiments of the second aspect and/or first aspect of the invention. In addition, advantages and advantageous embodiments of the second aspect of the invention are to be regarded as advantages and advantageous embodiments of the first and of the third aspect of the invention.

Further advantages, features and details of the invention emerge from the following description of a preferred exemplary embodiment and on the basis of the drawings. The features and feature combinations mentioned above in the description and the features and feature combinations mentioned hereinbelow in the description of the figures and/or shown on their own in the figures can be used not only in the respectively specified combination, but also in other combinations or in isolation, without departing from the scope of the invention.

DETAILED DESCRIPTION OF THE DRAWINGS

Figure 3:
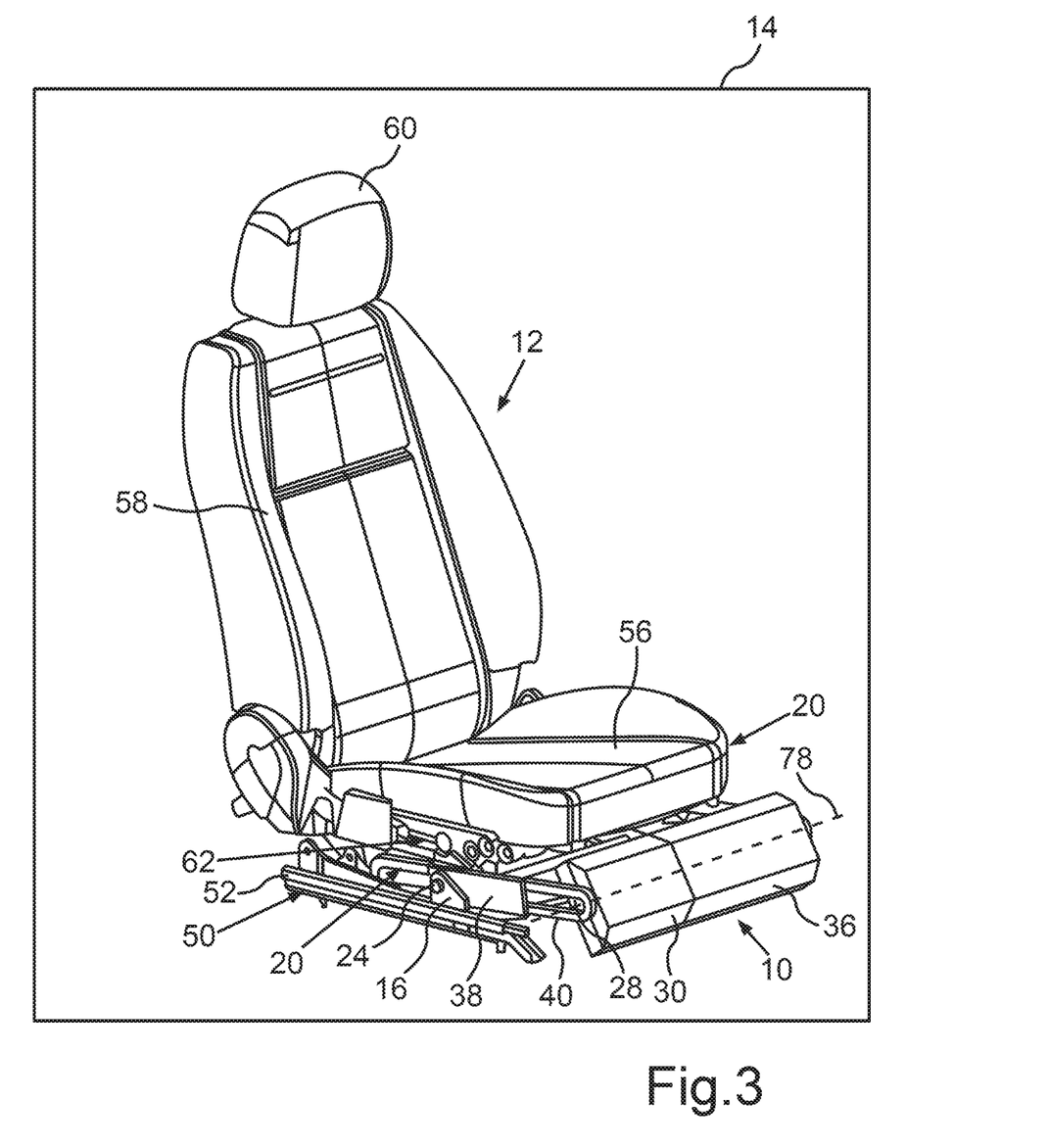
FIG. 3 shows, in a schematic perspective view, a vehicle seat in a motor vehicle with a lower-leg support according to FIGS. 1 and 2, wherein the support elements of the lower-leg support are in a non-use position.

Motor vehicles are helping people to become increasingly mobile. As a result, the interior of a motor vehicle, for example a passenger car, is used more frequently and hence in a more versatile way. Therefore, the vehicle interior should offer as much comfort as possible to a vehicle occupant. Furthermore, at the same time it is desirable that the increase in comfort is not accompanied by an increase in weight. Therefore, the following figures show a lower-leg support 10 for a vehicle seat 12, and the vehicle seat 12, which is shown for example in FIG. 3. FIG. 3 also shows at least schematically a motor vehicle 14, which comprises the vehicle seat 12 and thus the lower-leg support 10. In this case, the lower-leg support 10 shown, which is used to support at least one lower leg or at least one calf of the vehicle occupant and can also be referred to as a calf support, has a dual function for a particularly high level of comfort and a particularly low weight.

Figure 1:
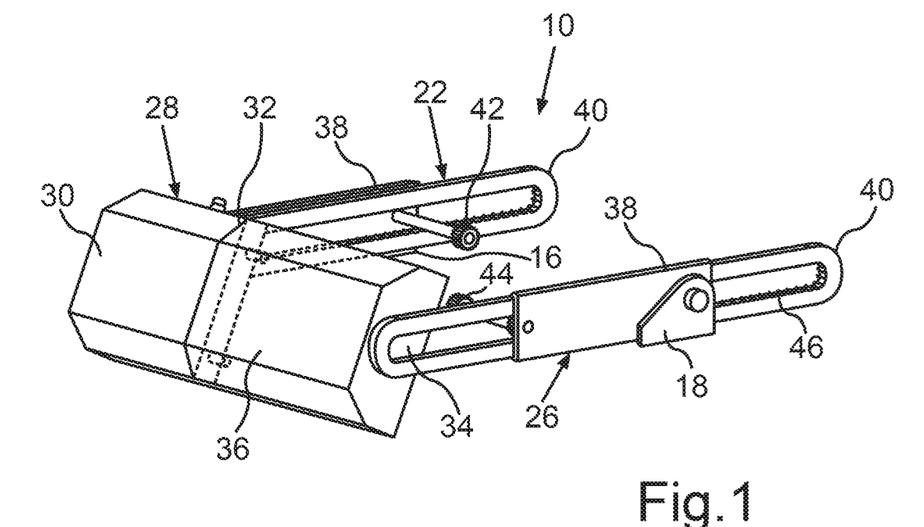
FIG. 1 shows, in a perspective oblique view, a lower-leg support for a vehicle seat.

As FIG. 1 shows in a schematic perspective view, the lower-leg support 10 comprises a first securing element 16 and a second securing element 18. The first securing element 16 and the second securing element 18 are used to secure, i.e., to hold, the lower-leg support 10 to opposite side areas 20 of the vehicle seat 12, as shown in FIG. 3, and thus to hold the lower-leg support 10 on or with respect to the vehicle seat 12.

A first displacement element 22 is rotatably connected to the first securing element 16, in particular via a swivel joint 24. A second displacement element 26 is rigidly connected to the second securing element 18. In contrast to the first displacement element 22, secure in the context of the second displacement element 26 means substantially non-rotatably.

A first rotatably held support element 30 is provided at an end 28 of the first displacement elements 22 in a use position opposite the first securing element 16. By means of a locking device 32, the first support element 30 can be locked to a second support element 36 rotatably arranged at an end 34 of the second displacement element 26 facing away from the second securing element 18 in the use position. Both FIG. 1 in its schematic perspective view and FIG. 2 in its plan view show the support elements 30 and 36 locked to each other by the locking device 32.

Figure 6:
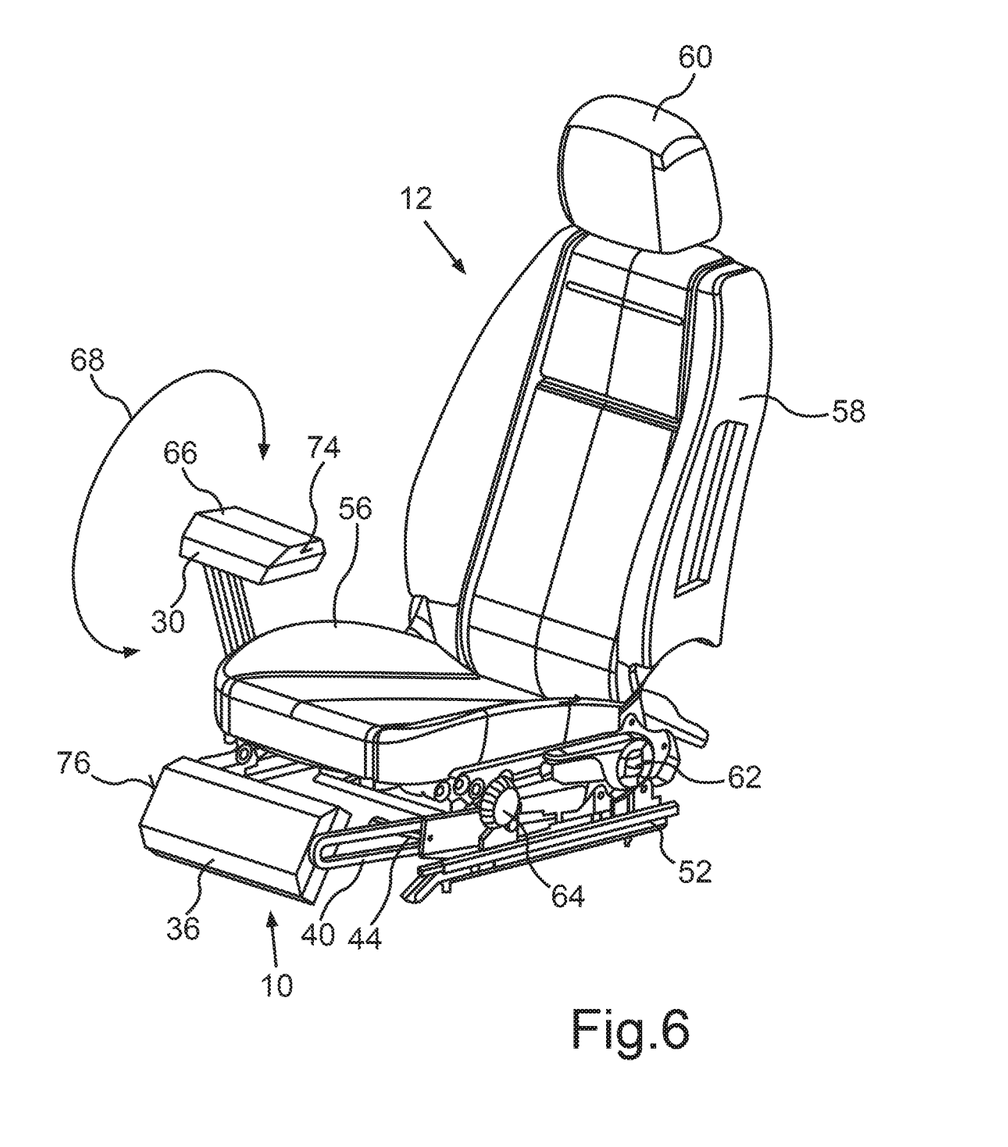
FIG. 6 shows, in a schematic perspective view, the vehicle seat according to FIG. 3 to 5, wherein the first of the support elements is in a table position and the second of the support elements is in the use position.
Figure 7:
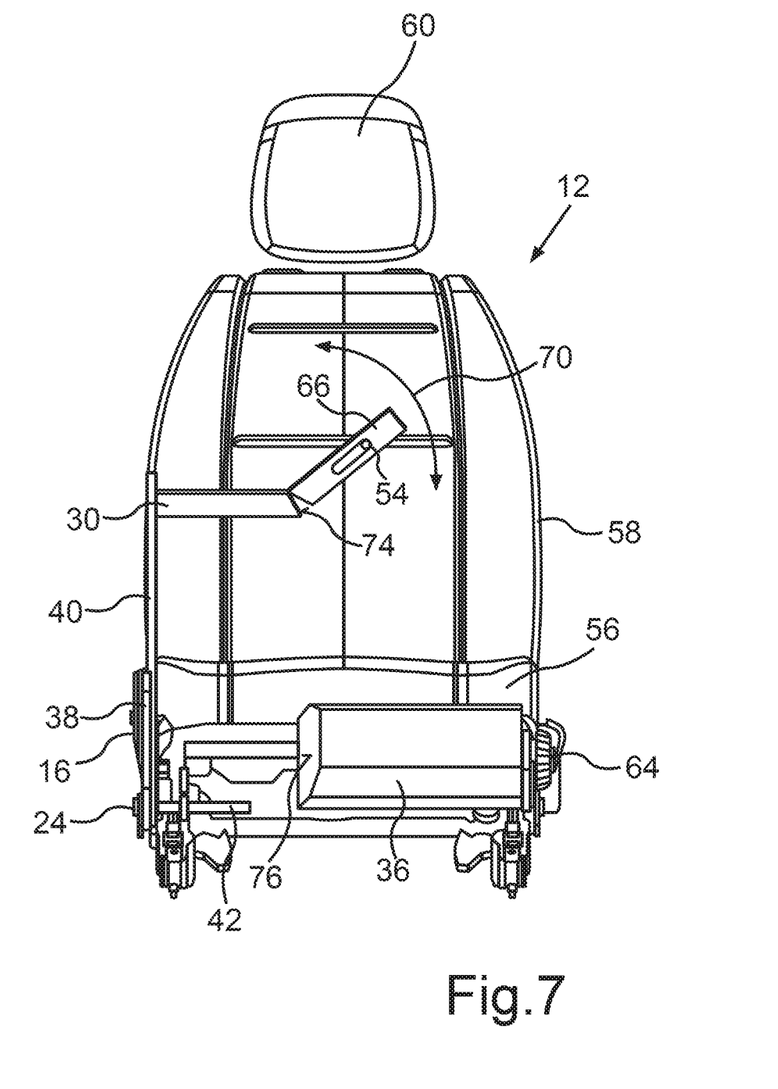
FIG. 7 shows, in a schematic front view, the vehicle seat according to FIG. 3 to 6, wherein a table extension element of the first support element is folded.
Figure 8:
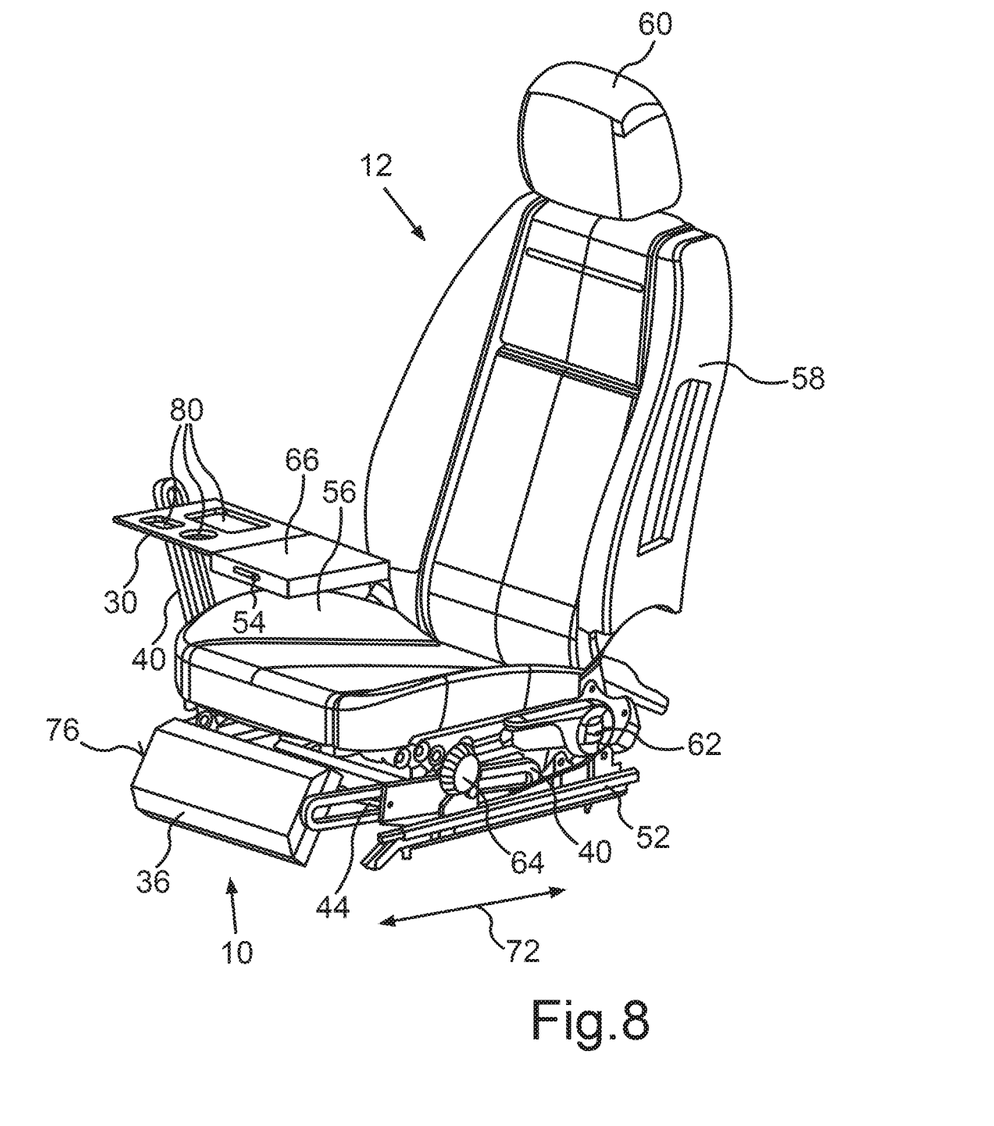
FIG. 8 shows, in a schematic perspective view, the vehicle seat according to FIG. 3 to 7, wherein the table extension element is folded out and the second support element is moved between the use position and the non-use position into a usage position.

So that the lower-leg support 10 shown can be used particularly advantageously and with a particularly wide range of functions, the first support element, which is unlocked from the second support element 36, can be transferred in the use configuration into a table position, which is shown in FIG. 6 to 8, by rotating the first displacement element 22 with respect to the first securing element 16.

Advantageously, the respective displacement element 22 and 26 is formed from a guide element 38 connected to the respective securing element 16 and 18 and a support arm 40 which can move relative to the guide element 38 and which has the respective end 28 and 34 at which the respective support element 30 or 36 is arranged.

Drives 42 and 44 are provided in order to move the support elements 30 and 36, which in the use position are used by the vehicle occupant to rest their lower legs, from their non-use position in a particularly advantageous manner and, in addition, to displace the first support element 30 from the use position into the table position. The first drive 42 is used to displace the first support element 30 from the use position into the table position and back. The second drive 44 is used to displace the two locked-together support elements 30 and 36 between the use position and the non-use position, in which, as shown in FIG. 3, the support elements 30 and 36 rest against or below a seat element 56 of the vehicle seat 12, respectively.

Figure 2:
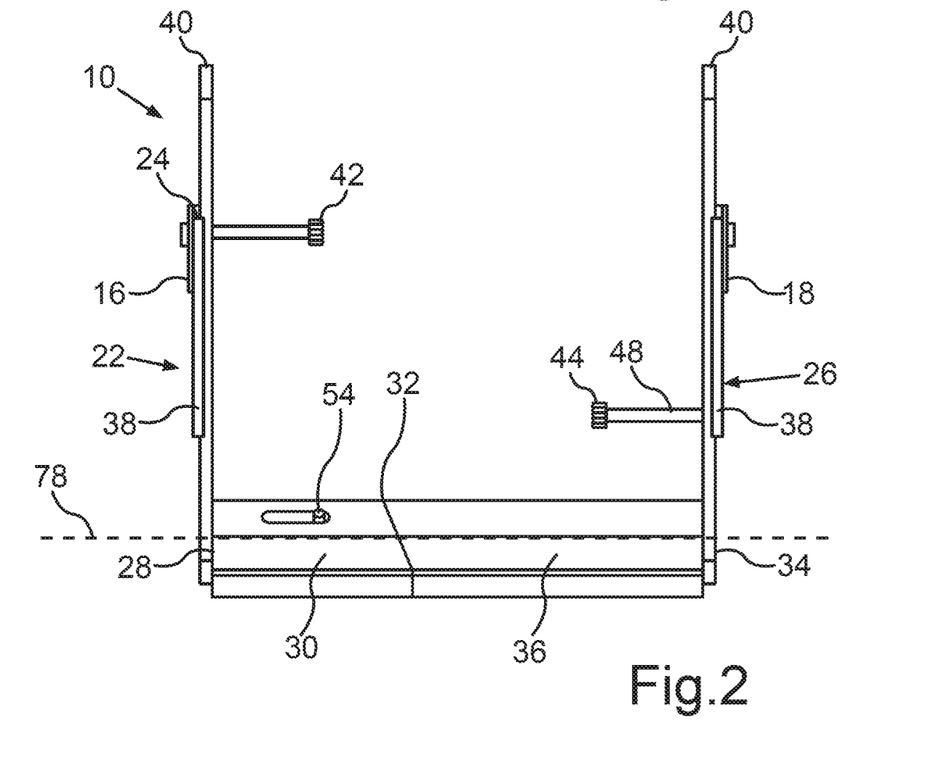
FIG. 2 shows, in a schematic plan view, the lower-leg support comprising two support elements according to FIG. 1.

It can be seen from both FIGS. 1 and 2 that the second support arm 40 of the second displacement element 26 has a toothing 46, additionally or alternatively a toothed rack and additionally or alternatively a spindle 48, via which the displacement between the use position and the non-use position can be carried out or effected by means of the second drive 44. Additionally or alternatively, a further toothing and/or a further toothed rack and/or a further spindle can be provided in order to carry out or effect the displacement between the use position and the table position by means of the first drive 42.

FIG. 2 also shows that the locking device 32 advantageously has a control element 54 for locking or unlocking, i.e., for opening and closing the locking device 32 and thus for connecting or disconnecting the two support elements 30 and 36 to or respectively from each other.

Due to the respective rotatable mounting or arrangement of the respective support elements 30 and 36 at the respective end 28 and 34, the two support elements 30 and 36 can be rotatable about an axis of rotation 78. The axis of rotation 78 can be divided when the locking device 32 is open and as a result of the possible disconnection of the two support elements 30 and 36.

FIG. 3 shows a schematic perspective view of the lower-leg support 10 arranged on the vehicle seat 12. FIG. 3 also shows a schematic arrangement of the vehicle seat 12 in the schematically depicted motor vehicle 14.

The vehicle seat 12 shown has a length adjustment device 50 which has length adjustment rails 52. So that the lower-leg support 10 can be held or secured on the vehicle seat 12 in a particularly advantageous manner, the first securing element 16 is secured to a first of the length adjustment rails 52 on a first of the side areas 20. The second securing element 18 is, by contrast, secured on a second of the length adjustment rails 52 on the second side area 20.

So that the vehicle seat 12 can be used in a particularly advantageous manner, the first securing element 16 of the motor vehicle 14, which has the vehicle seat 12, is arranged on a side of the vehicle seat 12 facing away from a vehicle door and thus on the tunnel side as opposed to the door side.

The vehicle seat 12 can also comprise, in addition to the seat element 56, a backrest 58 and a headrest 60. The seat element 56 can also have a frame element 62 which is arranged on the length adjustment device 50 via the length adjustment rails 52. Furthermore, the vehicle seat 12 can have partially shown trim elements and/or an adjustment element 64 for the length adjustment device.

Figure 4:
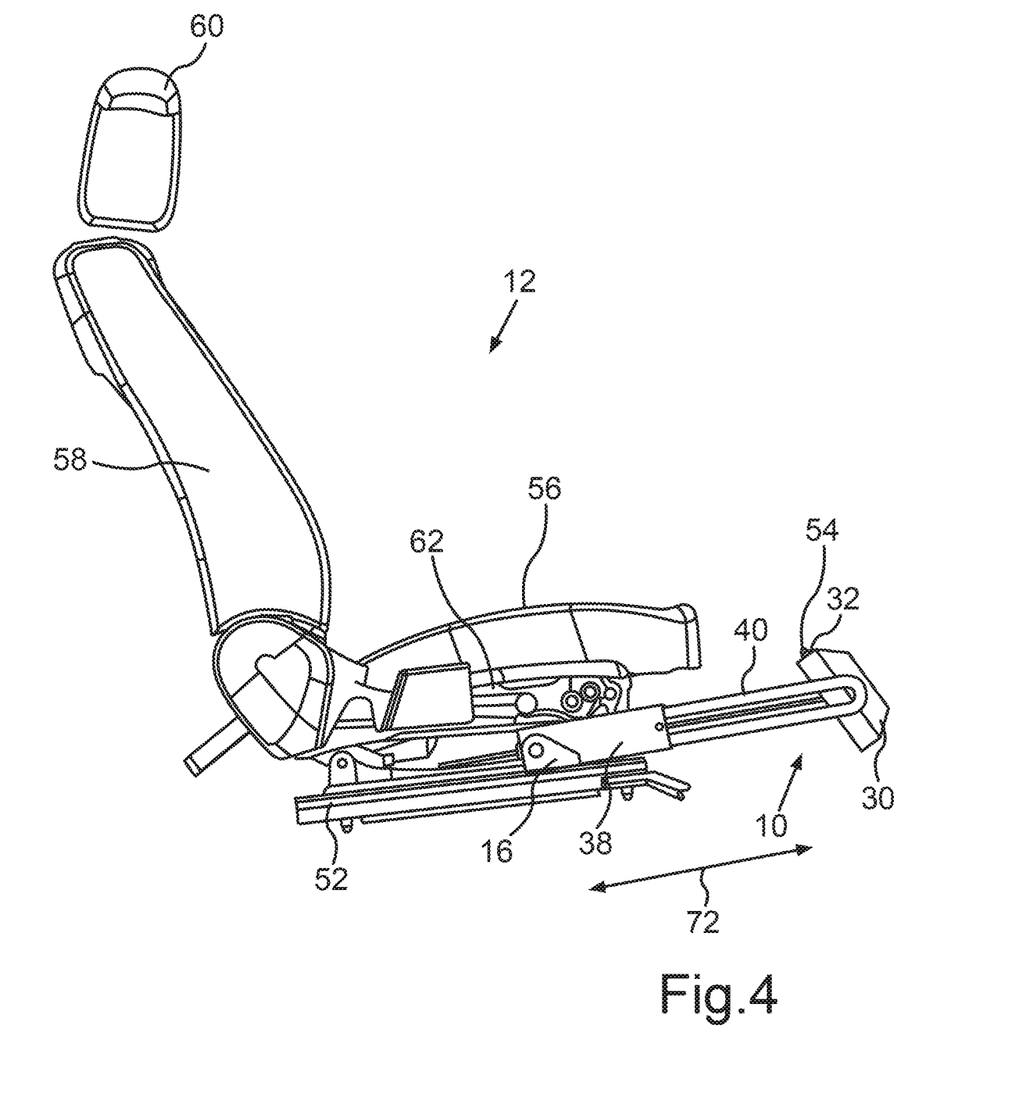
FIG. 4 shows, in a schematic side view, the vehicle seat with lower-leg support according to FIG. 3, wherein the support elements are in a use position.

In order to use the lower-leg support 10 in its use position for supporting the lower legs and furthermore to use the first support element 30 as a table in the table position, a method comprising several steps can be provided for operating the lower-leg support 10:

In a first step, the support elements 30 and 36, in particular the two support elements that are connected because they are locked, are fully extended by means of the drive 44 into the use position shown in FIG. 4. In contrast thereto, FIG. 3 shows the lower-leg support or its support elements 30 and 36 in the non-use position. The displacement or movement between the use position and the non-use position is advantageously effected along a displacement direction 72.

Figure 5:
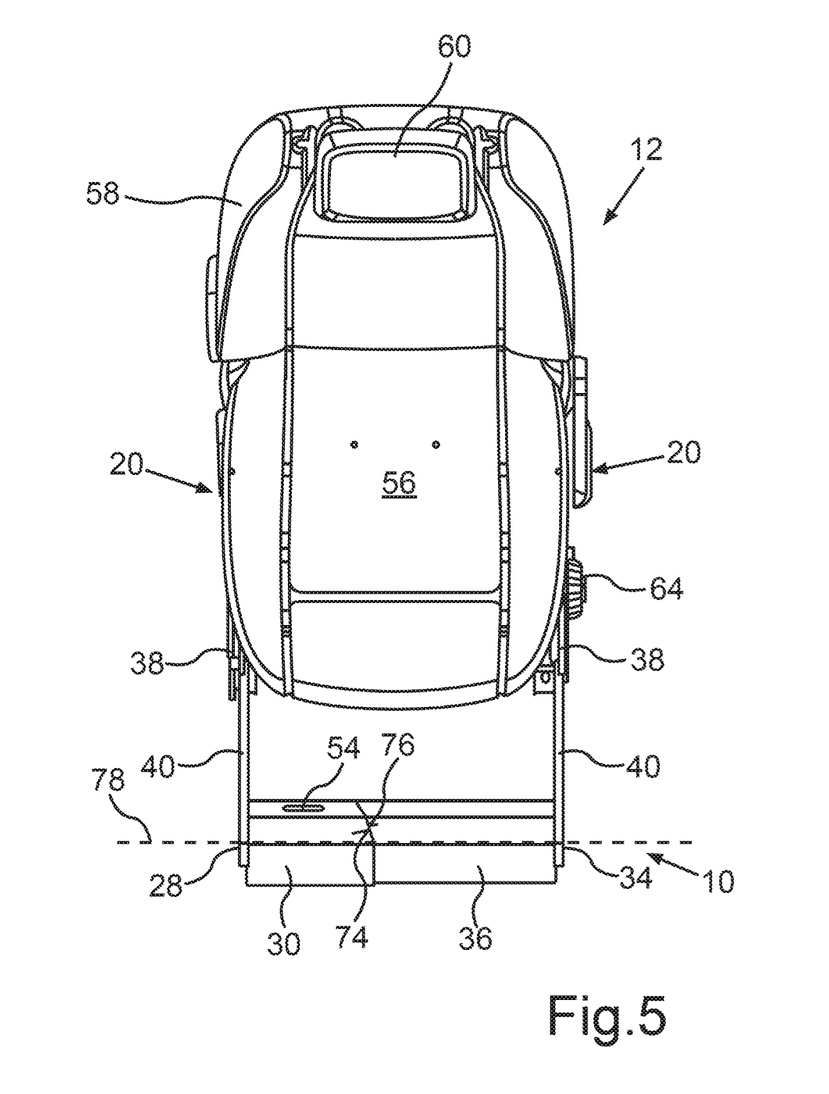
FIG. 5 shows, in a schematic plan view, the vehicle seat according to FIGS. 3 and 4, with the support elements unlocked from each other in the use position.

FIG. 5 shows how, in a second step of the method, the locking device 32 is unlocked via the control element 54, which is in a locked or closed position in FIGS. 1 to 4.

In a third step of the method, the first support element 30 is moved from the use position into the table position, in particular by the first drive 42. The table position is shown in FIG. 6 as well as in FIGS. 7 and 8.

FIG. 6 also shows how, in a fourth step, by rotating the first support element 30 along the direction of rotation 68 indicated by an arrow, the support element 30 is rotated from a lower-leg support position, in which for example a cushion side of the support element 30 faces a vehicle headliner, into a tabletop position. In the tabletop position, one, in particular tabletop-like, side of the support element 30 faces the vehicle headliner. This is shown in FIG. 7.

Subsequently, in a fifth step shown in FIG. 7, a table extension element 66 can be unfolded along a folding direction 70 indicated by an arrow to create a particularly wide usable table surface, as can be seen in FIG. 8.

Alternatively of this mode of operation, the invention can also be executed in such a way that the rotation in the direction of rotation 68 shown in FIG. 6 can be dispensed with. I.e., the support element 30 is swivelled upwards as described above, as shown in FIG. 6 directly with the surface also functioning as a calf support as a table surface, or/and the table surface is created by subsequent swivelling process in the folding direction 70.

Finally, in a sixth step, a length adjustment can be carried out. The result of the length adjustment is shown in FIG. 8. A distance between seat element 56 and second support element 36 is adjusted by moving the displacement element 26 along the displacement direction 72, whereby a usage position can be assumed which differs from the use position. In the use position, the support element 36 (and/or 30) is fully extended over the displacement element 26 (and/or 22). The usage position can be the use position or a position of the support element 36 or the support elements 30 and 36 that differs from the non-use position. The displacement direction 72 is the direction along which the support elements 30 and 36 are displaced between the non-use position and the use position. In this case, even in a locked state of the two support elements 30 and 36, a usage position of the support elements 30 and 36, in particular depending on a leg length of the vehicle occupant, can be adjusted between the use position and the non-use position to support the lower legs.

As can be seen in particular by comparing FIGS. 5 to 7, the first support element 30 has a first connecting surface 74 which is oriented so as to be congruent with or is aligned with a second connecting surface 76 of the second support element 36 while the two support elements 30 and 36 are locked to each other, as shown in FIG. 5. Furthermore, by forming a region of overlap, the two connecting surfaces 74 and 76 are used to contact each other when the first support element 30 is displaced from the table position into the use position, thereby allowing the support elements 30 and 36 to be able to be moved towards each other for a particularly simple locking of the locking device 32. This is illustrated by the orientation of the connecting surfaces 74 and 76 to each other in FIGS. 6 and 7.

The figures also show that the second support element 36 is wider than the first support element 30, in particular the second support element 36 has twice the width of the first support element 30. Thus, one third of the total width of the lower-leg support 10 is formed by the first support element 30 and two thirds by the second support element 32. Due to the width of the wider, second support element 36, when the first support element 30 is used in the table position, enough space can be provided to place both of the lower legs of the vehicle occupant.

Finally, in particular FIGS. 7 and 8 show that the first support element 30 has a foldable table extension element 66. In this case, in the table surface formed by the support element 30, as can be seen in FIG. 8, storage recesses 80 for example can also be provided for depositing objects, in particular beverage cups for example.

In summary, the figures show a lower-leg support 10, a vehicle seat 12 and a motor vehicle 14. A support bearing in the form of the support elements 30 and 36 is arranged on the right and left of the vehicle seat 12 on moving length adjustment rails 52, respectively. A guide element 38 is connected to each of these support bearings, whereby the guide element 38 is rigidly connected to the support bearing on the door side and/or is made in one piece. Meanwhile, on the tunnel side, i.e., the side facing away from the door, the guide element 38 is connected to the support bearing via the swivel joint 24. In addition, the guide element 38 on the tunnel side is connected, in particular rigidly, to the drive 42, which swivels it upwards for the table function.

These guide elements 38 shift the support arms 40 of the calf support or the lower-leg support 10. Thus, the calf support is moved from the non-use position, in which the support elements 30 and 36 are located in particular directly on the seat cushion or the seat element 56, into the usage position desired by the vehicle occupant up to a maximum of the use position. The actual calf support is hereby rotatably mounted, in particular about the respective axis of rotation 78. In this way, the lower-leg support or its calf support formed from the support elements 30 and 36 can automatically align itself to an angle that is particularly advantageous for the vehicle occupant by being able to rotate. For a forward and backward movement between the use position and the non-use position, the support arm 40, in particular on the tunnel side, is preferably equipped with the toothing 46, which is used to execute the displacement via the drive 44. Alternatively, the support arm 40 can be equipped with a toothed rack or also additionally or alternatively with the spindle 48 for the drive.

Advantageously, the actual calf support comprises a two thirds to one third subdivision of the support elements 30 and 36, whereby the two thirds support element 36 is used exclusively as calf support, while the one third support element 30 can be used both as calf support and as a table. For the table function, the calf support must now first be brought into the foremost position, i.e., the use position. Then a locking mechanism, the locking device 32, must be opened for the division of the calf support formed by the support elements 30 and 36. The vehicle occupant should move their legs slightly towards the door-side part of the lower-leg support 10 for ease of operation. The drive 42 can then be used to swivel the table, which is substantially formed by the support element 30, upwards into the table position. For the use as a table, this part of the calf support in particular is rotated by 180 degrees and can be unfolded again to enlarge the table surface. Alternatively, the design can be implemented in such a way that the 180O rotation can be dispensed with and, on the one hand, the ⅓ calf support is used directly as a table surface, or, on the other hand, the table surface is created by unfolding it. Since the support arm 40 for the table function is advantageously arranged on the tunnel side, it is also possible to get in and out of the vehicle seat 12 easily while the table function is being used.

While the support element 30 is in the table position, the door-side part of the calf support, the support element 36, can be moved forwards and backwards as required to achieve an advantageous usage position. In order to restore the original calf support function, the support element 30 is swivelled down via the rotation and the support element 36, if this is in a usage position different from the use position, is brought into the use position and thus into the foremost position, which for example can be seen in FIGS. 4 to 7. In contrast thereto, FIG. 8 shows a usage position that differs from the use position. Due to the oblique connecting surfaces 74 and 76, the two support elements 30 and 36 can be positioned in relation to each other particularly easily so that in the foremost position—in the use position—of the two support elements 30 and 36, they come together in a conveniently motion-controlled manner from a certain pivot angle setting. Now the locking device 32 can be closed again and the calf support of the lower-leg support 10 formed from the support elements 30 and 36 can be used like a conventional calf support.

In short, a lower-leg support 10 for a vehicle seat 12 is shown, comprising a first securing element 16 and comprising a second securing element 18, which are designed to secure the lower-leg support 10 to the vehicle seat 12, a first support element 30 is provided at a first end 28 of the first displacement element 22 and is rotatably held on the first displacement element 2 and can be locked by means of a locking device 32 to a second, support element 36 which is rotatably arranged on a second end 34 of the second displacement element 26, wherein the two support elements 30, 36 can be displaced from a use position into a non-use position by means of the displacement elements 22, 26 and the first support element 30 can additionally be transferred from the use configuration into a table position.

The lower-leg support 10 shown can also be used in the same way on a permanently fixed vehicle seat in contrast to the exemplary embodiment of the vehicle seat 12, without a length adjustment device 50, in which case the securing elements 16 and 18 and, for example, in particular also the drives 42 and 44 are connected directly to a floor connection of the vehicle seat.

The lower-leg support 10 shown, the vehicle seat 12 and the motor vehicle 14 offer a particularly high level of comfort and a certain functional versatility while at the same time being particularly compact in terms of installation space or weight.

The invention claimed is:

1. A lower leg support (10) for a vehicle seat (12), comprising:
   a first securing element (16) and a second securing element (18) which are configured to secure the lower-leg support (10) to opposite-lying side areas (20) of the vehicle seat (12);
   a first displacement element (22) rotatably connected to the first securing element (16);
   a second displacement element (26) rigidly connected to the second securing element (18);
   a first support element (30) rotatably held on an end (28) of the first displacement element (22) that faces away from the first securing element (16) in a use position;
   a second support element (36) that is rotatable on an end (34) of the second displacement element (26) and that faces away from the second securing element (18) in the use position; and
   a locking device (32), wherein the first support element (30) is lockable by the locking device (32) against the second support element (36);
   wherein the first support element (30) and the second support element (36) are displaceable from the use position into a non-use position by the first displacement element (22) and the second displacement element (26) and wherein, in the use position, the first support element (30), when unlocked from the second support element (36), is transferrable into a table position by rotation of the first displacement element (22) relative to the first securing element (16).

2. The lower-leg support (10) according to claim 1, wherein the first support element (30) has a foldable table surface extension element (66).

3. The lower-leg support (10) according to claim 1, wherein the first displacement element (22) is formed from a first guide element (38) connected to the first securing element (16) and a first support arm (40) which is movable relative to the first guide element (38) and which has the end (28) on which the first support element (30) is disposed and wherein the second displacement element (26) is formed from a second guide element (38) connected to the second securing element (18) and a second support arm (40) which is movable relative to the second guide element (38) and which has the end (34) on which the second support element (36) is disposed.

4. The lower-leg support (10) according to claim 3, further comprising a first drive (42) via which the first support element (30) is displaceable from the use position into the table position and a second drive (44) via which the first support element (30) and the second support element (36) when locked to each other are displaceable between the use position and the non-use position.

5. The lower-leg support (10) according to claim 4, wherein the second support arm (40) has a toothing (46) or a toothed rack or a spindle (48) via which displacement between the use position and the non-use position is carried out by the second drive (44).

6. The lower-leg support (10) according to claim 1, wherein the first support element (30) has a first connecting surface (74) which is oriented congruent with a second connecting surface (76) of the second support element (36) while the first support element (30) and the second support element (36) are locked to each other and/or the first connecting surface (74) and the second connecting surface (76) have a region of overlap via which the first connecting surface (74) and the second connecting surface (76) touch each other when the first support element (30) is displaced from the table position into the use position and the first support element (30) and the second support element (36) are movable towards each other to lock the locking device (32).

7. The lower-leg support (10) according to claim 1, wherein the second support element (36) is wider than the first support element (30).

8. A vehicle seat (12), comprising:

the lower-leg support (10) according to claim 1, wherein the first securing element (16) and the second securing element (18) are secured to a floor connection of the vehicle seat (12) or wherein the vehicle seat (12) has a length adjustment device (50) with a first length adjustment rail (52) and a second length adjustment rail (52) and the first securing element (16) is secured to the first length adjustment rail (52) and the second securing element (18) is secured to the second length adjustment rail (52).

9. A motor vehicle (14), comprising:

the vehicle seat (12) according to claim 8.

10. The motor vehicle (14) according to claim 9; wherein the first securing element (16) is disposed on a side of the vehicle seat (12) facing away from a vehicle door.

* * * * *